(No Model.)
J. G. LEEP.
NUT LOCK.
No. 413,402. Patented Oct. 22, 1889.
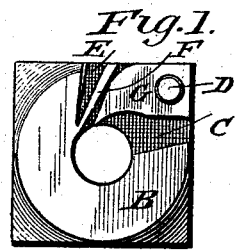
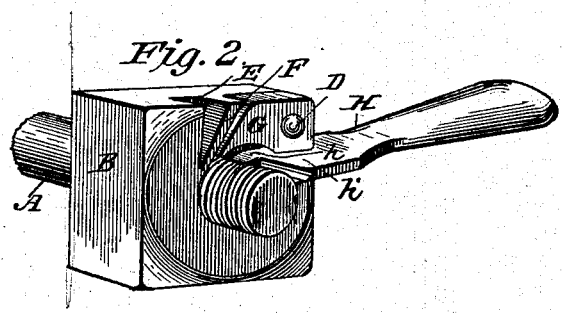
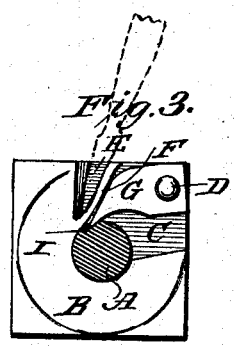
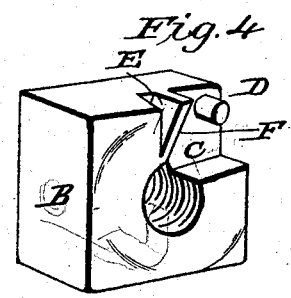
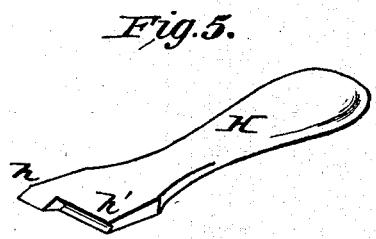
WITNESSES:
Fred G. Dieterich
Jos. A. Ryan
INVENTOR
Jeremiah G. Leep
BY Munn & Co
ATTORNEY

UNITED STATES PATENT OFFICE.

JEREMIAH G. LEEP, OF RED HOUSE SHOALS, WEST VIRGINIA.

NUT-LOCK.

SPECIFICATION forming part of Letters Patent No. 413,402, dated October 22, 1889.

Application filed May 2, 1889. Serial No. 309,400. (No model.)

*To all whom it may concern:*

Be it known that I, JEREMIAH G. LEEP, of Red House Shoals, in the county of Putnam and State of West Virginia, have invented a new and useful Improvement in Nut-Locks, of which the following is a specification.

My invention is an improvement in that class of nut-locks in which a dog is pivoted to the nut and its pointed free end held engaged with the thread of the screw-bolt by contact with a flexible portion of the nut, which is bent or forced inward against it.

In carrying out my invention I construct the nut with a V-shaped recess alongside the larger one in which the dog is pivoted, the wall or partition which separates them being made as thin as practicable, so that it may be readily set inward against the dog by means of a suitable tool inserted in said V-shaped recess.

Referring to the accompanying drawings, Figure 1 is a side view of the nut removed from the bolt, taken from the outer side of the nut. Fig. 2 is a perspective side view showing the nut on the bolt and the chisel introduced to form the notch or recess. Fig. 3 is a perspective side view showing the nut locked on the bolt. Fig. 4 is a perspective side view of the nut with the dog removed, and Fig. 5 is a detail view of the small chisel I prefer to employ and the bolt after the recess is formed in it.

The same letters of reference indicate corresponding parts in all the figures.

Referring to the several parts by letter, my invention relates to that class of nut-locks in which the nut is locked on the bolt by a dog on the nut locking in a notch or recess in the bolt.

A indicates an ordinary bolt formed with the usual screw-thread, and B indicates a nut the central opening of which is formed with a screw-thread. This nut B has two recesses cut or pressed in its outer face or side. The largest recess C is of the shape shown, running from the central opening of the nut to one corner thereof and to the edges on each side of said corner. A pivot-pin D is left standing near this corner, being formed integral with the nut. The smaller recess E is cut or pressed just to the left of the main recess C, leaving a thin wall F between the two recesses, which is just over the outer shoulder and end of the ratchet G when the latter is in position.

The dog G is formed near its outer end with a circular opening $g$, through which the pivot-pin D passes, and the outer edges of the ratchet are straight to conform with the edges of the nut, so that the dog does not project to interfere with a wrench placed on the nut to screw it on the bolt. The inner end of the pawl or dog curves in, so that its sharp point is a little beyond the central line of the threaded nut-aperture.

In operation, the nut being screwed moderately tight on the bolt, a small chisel, as H, is slipped under the dog, as shown in Fig. 2, with its inner end touching the bolt, when a single blow with a hammer will cause the chisel to form a longitudinal notch or recess I in the bolt. I prefer to use the small chisel shown in Fig. 5, having the point $h$ and wide edge $h'$ at its operative end, as shown, the point $h$ forming the recess I on a bolt. The recess I being thus formed, the nut is turned slightly, tightening it still further, until the point of the dog drops in the recess I in the bolt. The wide edge of the chisel is then driven in the small wedge-shaped recess E, forcing the thin partition or wall F over against the beveled or inclined free end of the dog and firmly locking its point in the recess I of the bolt, securely holding the nut at the tightest point to which it has been forced or turned.

To unlock the nut, the chisel is first driven between the dog and the wall to raise the former and then under the dog to raise its point out of the recess I, when the nut can be removed, or screwed on tighter to take up wear, and again locked, as before. The end of the pivot is enlarged by blows to hold the dog on it.

The nut can be firmly locked on a bolt without using the chisel to form any recess in the bolt itself, by knocking down the thin wall or partition F to force the point of the ratchet G into engagement with the bolt, the dog being so formed and arranged that, when the partition F is knocked down against it, its sharp point will be pressed into the bolt.

Having thus described my invention, what I claim, and desire to secure by Letters Patent, is—

The nut having the V-shaped recess E, the recess C, and the thin flexible intervening wall or partition F, and the dog G, pivoted in said recess C and arranged with its free beveled end adjacent to said partition, whereby the latter may be forced against the dog to hold it engaged with the bolt, as shown and described.

JEREMIAH G. LEEP.

Witnesses:
E. C. KINNISON,
B. A. BROWN.